Patented Aug. 22, 1933

1,923,243

UNITED STATES PATENT OFFICE 1,923,243

PRODUCTION OF COLORING PREPARATIONS AND THEIR APPLICATION

Heinrich Ulrich and Joseph Nuesslein, Ludwigshafen-on-the-Rhine, Germany, assignors to General Aniline Works, Inc., New York, N. Y., a Corporation of Delaware No Drawing. Application March 13, 1931, Serial No. 522,507, and in Germany March 20, 1930. Renewed May 23, 1933

10 Claims. (Cl. 8—6)

The present invention relates to the production of coloring preparations and their application.

We have found that valuable coloring preparations are obtained by incorporating the internal ethers known as morpholines (obtained by splitting off water from hydroxy-alkylamines) and corresponding to the general formula:

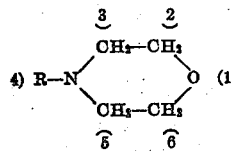

in which R is hydrogen or an alkyl, aryl or cycloalkyl radicle which may also contain a substituent, as for example a hydroxyl or amino group, and one or more hydrogen atoms of the nucleus may be replaced by alkyl groups, with coloring materials or preparations containing the same. Ethers of the aforesaid nature are for example N-methyl, 2.6-dimethyl or N-ω-hydroxy-ethyl morpholines, N-phenyl morpholine or N-cyclohexyl morpholine and the like. The said ethers may be employed as such or in the form of their salts with inorganic or organic acids such as hydrochloric, sulphuric, formic or acetic acids or the acids of animal or vegetable fats or oils and the like. The amount of the ethers employed will usually vary between 1 and 500 per cent, preferably between 50 and 500 per cent by weight of the coloring matter.

The employment of the said bases or their salts for the production of printing pastes or dyebaths is advantageous because the presence of the bases or their salts promotes the equalization and thorough dyeing and prints and dyeings are obtained therewith which are usually distinguished by clarity and depth. Furthermore, the bases and their salts have a good dispersing power for dyestuffs, so that it is especially suitable to employ them for the preparation of high quality dyestuff powders and pastes in which the coloring materials are very finely dispersed and remain in this state on dissolving or diluting the preparations. If desired, the said preparations may contain organic diluents such as glycerol and/or reducing agents such as are employed for vatting purposes, such as glucose or formaldehyde sulphoxylates.

The following examples will further illustrate the nature of this invention but the invention is not restricted to these examples. The parts are by weight.

Example 1

1 cubic centimetre of morpholine is added to each litre of a dyebath for 100 kilograms of woolen piece goods containing in 3 cubic metres of water 100 grams of wool fast yellow (Schultz, Farbstofftabellen 1923, No. 23), 25 grams of anthraquinone blue SR Extra (Schultz, Farbstofftabellen 1923, No. 861), 200 grams of supramine red B (Schultz, Farbstofftabellen 1923, Vol. 2, page 104), 10 kilograms of Glauber's salt and 4 kilograms of a 98 per cent sulphuric acid. The goods are introduced into the dyebath at about 60° C. and are finished off in the usual manner. In this manner level dyeings free from objection are obtained without difficulty with a combination of dyestuffs which under ordinary conditions are badly levelling and unsuitable for the preparation of mixed shades.

Example 2

A dyebath of 1 cubic metre for 100 kilograms of woollen hat bodies is charged with 8 kilograms of naphthylamine black 10B (Schultz, Farbstofftabellen 1923, No. 217), 10 kilograms of Glauber's salt, 5 kilograms of acetic acid and 3 kilograms of N-ω-hydroxyethyl morpholine,

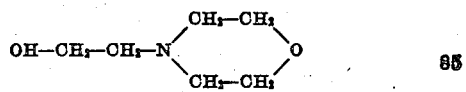

(prepared by splitting off water from triethanolamine by heating for 3 hours to 170° C. in the presence of a 70 per cent aqueous sulphuric acid), brought rapidly to boiling, the hat bodies are introduced into the boiling bath, 5 kilograms of sulphuric acid are added in several portions during the course of half an hour and the whole is boiled for another hour to complete the treatment. Well and thoroughly dyed wool waste is obtained in a much shorter time than would otherwise be the case, even with material which is thoroughly dyed only with difficulty. By the shortening of the dyeing process, a protection against injury to the fibres is obtained.

Example 3

A paste of 100 grams of indanthrene violet R Extra Paste (Schultz, Farbstofftabellen 1923, No. 766), together with 100 grams of hydrosulphite, 200 grams of N-phenyl morpholine (obtainable by the action of aniline on dichlorethyl ether), 100 grams of potash and 600 grams of starch—British gum thickening, is printed onto cotton and the prints are dried, steamed for 5 minutes in a Mather Platt apparatus, rinsed, soaped and finished off. Beautiful, clear, deep prints are obtained.

*Example 4*

100 parts of indanthrene blue RS Paste (Schultz, Farbstofftabellen 1923, No. 838) are mixed with 1 part of the internal ether

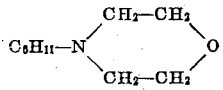

(obtained by splitting off water from N-cyclohexyl diethanolamine) and the mixture is evaporated to dryness and pulverized. When carefully made into a paste with water, a suspension is obtained which is equal to the original paste as regards its degree of dispersion. The dyestuff powder prepared in this manner has the important advantages, contrasted with the aqueous dyestuff paste, of having a smaller weight for the same amount and dispersion of dyestuff and of being stable to frost.

Instead of N-cyclohexylmorpholine the same amount of 2.6-dimethylmorpholine may be used.

What we claim is:—

1. As a new composition a coloring preparation comprising an organic coloring material and a morpholine.

2. As a new composition a coloring preparation comprising a water-insoluble organic coloring material and a morpholine.

3. As a new composition a coloring preparation comprising a vat dyestuff and a morpholine.

4. As a new composition a coloring preparation comprising a vat dyestuff, a morpholine and a reducing agent capable of reducing vat dyestuffs.

5. As a new composition a coloring preparation comprising an organic coloring material and morpholine.

6. As a new composition a coloring preparation comprising an organic coloring material and N-hydroxyethyl-morpholine.

7. As a new composition a coloring preparation comprising an organic coloring material and N-cyclohexyl-morpholine.

8. As a new composition a dyebath comprising between 50 and 500 per cent, by weight of the dyestuff, of a morpholine.

9. As a new composition a dyestuff paste comprising from about 100 to 200 per cent, by weight of the dyestuff, of a morpholine.

10. As a new composition a vat dyestuff paste comprising about 200 per cent, by weight of the dyestuff, of a morpholine and a reducing agent for said vat dyestuff.

HEINRICH ULRICH.
JOSEPH NUESSLEIN.